B. H. JOHNSON.
PULLEY.
APPLICATION FILED APR. 9, 1910.
1,017,152.
Patented Feb. 13, 1912.
FIG. I.
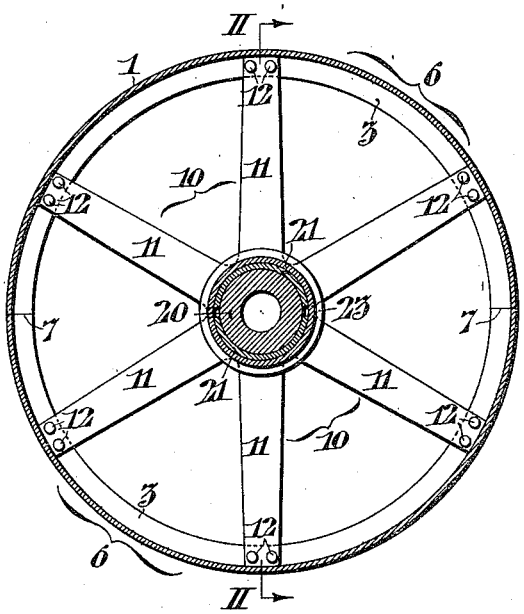
FIG. II.
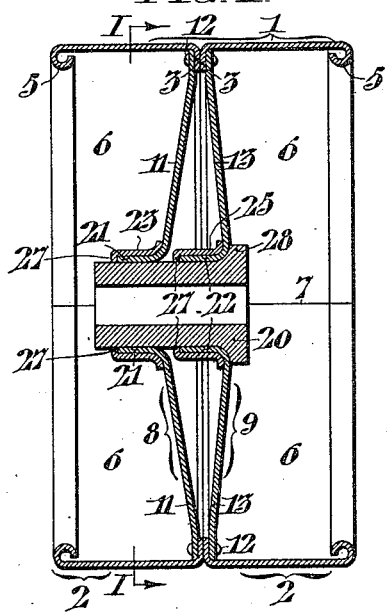
Witnesses
John C. Bergner
James H. Bell
Inventor
Burdette H. Johnson,
By Kary & Paul
Attorneys

UNITED STATES PATENT OFFICE.

BURDETTE H. JOHNSON, OF MOORES, PENNSYLVANIA, ASSIGNOR TO THE AMERICAN PULLEY COMPANY, OF PHILADELPHIA, PENNSYLVANIA, A CORPORATION OF PENNSYLVANIA.

PULLEY.

1,017,152. Specification of Letters Patent. Patented Feb. 13, 1912.

Application filed April 9, 1910. Serial No. 554,312.

*To all whom it may concern:*

Be it known that I, BURDETTE H. JOHNSON, of Moores, in the county of Delaware and State of Pennsylvania, have invented certain new and useful Improvements in Pulleys, whereof the following is a specification, reference being had to the accompanying drawings.

My invention relates to that class of pulleys whose rims are supported upon spokes which are formed in integral groups, or "spiders", said spiders being attached to a central hub.

The principal objects of my improvements are to permit the employment of relatively shorter hubs than have heretofore been used in connection with such spiders, and also to facilitate the offsetting of the hub with relation to the median plane of the pulley.

In the accompanying drawings, Figure I, is a vertical sectional view of a pulley embodying my improvements, the plane of section being at right angles to the axis of the pulley, and on the line I, I, of Fig. II, the direction of view being indicated by the arrows. Fig. II, is a vertical section of the pulley on a plane coinciding with the axis and on the line II, II, of Fig. I, the direction of view being indicated by the arrows.

In the instance shown, the structure is what is known as a whole pulley, that is to say, although its peripheral portion is diametrically divided, the periphery of the hub portion is continuous. The improvements are, however, not limited to this particular type of pulley.

The face or rim 1, of the pulley is preferably built up of pairs of similar sheet metal segments 2, 2, whose abutting edges are provided with inwardly extending radial flanges 3, 3, which are riveted together and to the spokes, as will be explained later. The outer edges 5, 5, of these segments are preferably rolled, or turned, inward to form beads, as shown, or they may be flanged like the abutting edges. Each pair of segments forms in this instance, a diametrical half-portion 6, of the rim, the edges of said halves abutting on the lines 7, 7.

The spoke elements comprise two spiders, indicated comprehensively at 8, and 9. The spider 8, is formed of the two similar sections 10, 10, each comprising, in this instance, three spokes 11, which are integral with the semi-circular bands 21. The spider 9, is formed of two sections similar to one another each comprising three spokes 13, formed integrally with the semi-circular bands 22. It will be noted that the pitch of the spokes 11, with relation to the band 23, is different from the pitch of the spokes 13, with relation to the band 22. Thus, the spokes 11, are inclined outwardly to the right in Fig. II, while the spokes 13, are inclined outwardly to the left. Furthermore, in this instance, the angle of inclination of the spoke 11, is somewhat less obtuse to the axis of the pulley in one direction, than is the angle of the spoke 13, to said axis in the other direction. The spokes of the spider 8, are opposite to those of the spider 9, and thus the outer ends of the spokes are secured in pairs to the flanges 3, 3, at similar circumferential intervals, by means of rivets 12, which also serve to connect the segments of the rim together.

The semi-circular bands 21, of the spider 8, are applied symmetrically to the hub 20, and are embraced by a collar 23, having a flange 27, corresponding in depth to the radial depth of the band. The bands 22, of the spider 9, are similarly applied, and embraced by a collar 25, both of said collars being adapted to be forced into position so as to clamp the bands tightly upon the hub 20. A circumferential shoulder 28, is provided near one extremity of the hub so as to determine the position of the spider 9, with relation thereto. The collars 23, and 25, with their flanges 27, hold the parts rigidly in position, thus enabling me to dispense with other fastening devices. It will be noted that the bands 21, and 22, when mounted upon the hub, are disposed upon the same side of their respective spiders, or in other words that they both lie to the left of the spokes in Fig. II.

Heretofore, in built up pulleys, where spiders were employed, it has been customary to make the spiders for the two sets of spokes similar in their inclination with relation to their respective bands and to the axis of the pulley, and when mounted upon the hub, the bands of one set of spiders were disposed in opposition to those of the other. This system of construction requires a relatively considerable length of hub, and does not readily lend itself to the offsetting of the median plane of the pulley with relation to the hub. In my improvements, the employment of spiders which differ in the pitch of their spokes, and whose bands are arranged in what may be termed similar relation to the hub attains the desired advantages in these respects. In the instance shown, the respective spiders are each constructed in two similar sections, each section comprising three spokes and a semi-circular band connecting said spokes at their inner extremities. It must be understood however that my invention is not limited to such construction, since each spider might comprise any desired number of spokes and the connecting bands in such case might be correspondingly extended. Hence in my claims I employ the term "spider," and the term "band" in a broad sense, not necessarily limited to sectional construction and without reference to the details of construction, sectional or otherwise.

Having thus described my invention, I claim:—

1. In a pulley, the combination of a rim; a hub, and two spiders, each comprising a plurality of spokes and a band connecting the same and arranged at an angle thereto, the spokes of one spider having a pitch with relation to its band, different from that of the other spider; said bands being mounted upon the hub to extend in the same direction with relation to their respective spokes; and means for securing the bands to the hub, substantially as set forth.

2. In a pulley, the combination of a rim; a hub, and two spiders, each comprising a plurality of spokes and a band connecting the same and arranged at an angle thereto, the spokes of one spider having a pitch with relation to its band, different from that of the other spider, said bands being mounted upon the hub to extend in the same direction with relation to their respective spokes; said hub being provided with a shoulder to provide an abutment for one of said bands; and collars adapted to embrace said bands and clamp them rigidly upon the hub, substantially as set forth.

In testimony whereof, I have hereunto signed my name, at Philadelphia, Pennsylvania, this fourth day of April 1910.

BURDETTE H. JOHNSON.

Witnesses:
JAMES H. BELL,
E. L. FULLERTON.

---

Copies of this patent may be obtained for five cents each, by addressing the "Commissioner of Patents, Washington, D. C."